Aug. 3, 1965  A. J. GEHRING, JR., ETAL  3,199,084
DATA TRANSLATOR
Filed Nov. 22, 1960  3 Sheets-Sheet 3
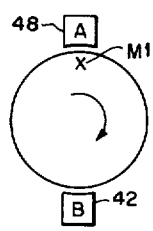
Fig. 4a
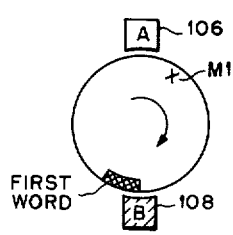
Fig. 4b
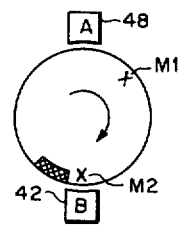
Fig. 4c
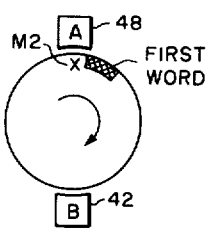
Fig. 4d
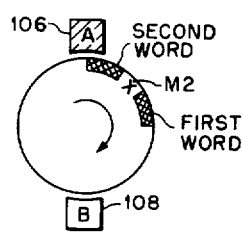
Fig. 4e
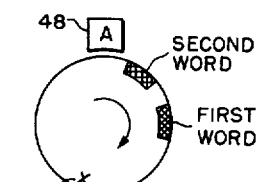
Fig. 4f
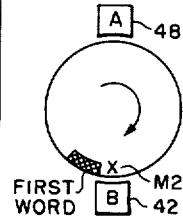
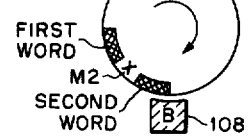
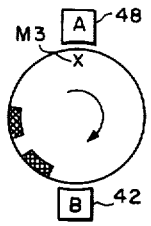
Fig. 4g
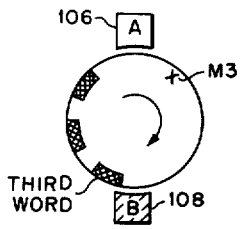
Fig. 4h
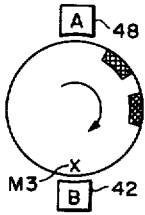
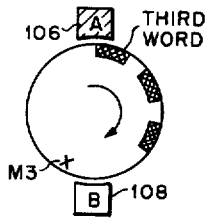
INVENTORS
LLOYD W. STOWE
ARTHUR J. GEHRING, JR.
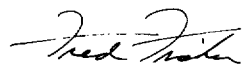
ATTORNEY

United States Patent Office 3,199,084
Patented Aug. 3, 1965

3,199,084
DATA TRANSLATOR
Arthur J. Gehring, Jr., Haddonfield, N.J., and Lloyd Wesley Stowe, Broomall, Pa., assignors to Sperry Rand Corporation, New York, N.Y., a corporation of Delaware
Filed Nov. 22, 1960, Ser. No. 70,992
8 Claims. (Cl. 340—172.5)

This invention relates to novel data translating systems and in particular relates to novel means for translating data from a slow moving medium, such as magnetic or paper tape, to a fast moving medium, such as a magnetic drum.

In addition, this invention relates to means for translating data onto a magnetic drum in a predetermined timed sequence, whereby precessing timing pulses on the magnetic drum index the transfer of data from an input medium to the drum.

In modern business practices, large amounts of data are usually recorded on magnetic tape, which is used for permanent or temporary storage, as desired. Often, it is desirable to perform various mathematical operations upon the data recorded on the tape, such as addition and multiplication, and to perform other operations such as sorting, collating, etc. To perform such operations, information is usually transferred from the tape onto a fast moving medium, such as a magnetic drum, upon which the data is manipulated.

Data is recorded on the drum at certain predetermined positions or addresses, so that desired information is located at known addresses. In the past, counters have been associated with drums for indexing the desired data. The counters and the periphery equipment generally associated therewith are extremely costly and uneconomical.

It is, therefore, an object of this invention to provide a novel and economical data translator.

It is another object of this invention to provide a novel means for indexing data upon a magnetic drum.

Still another novel object of this invention is to provide a novel means for precessing a timing marker pulse about the periphery of a magnetic drum.

In accordance with one embodiment of this invention, means are provided for inserting a timing marker pulse at a predetermined location on a magnetic drum so that one word of input data can be recorded on the drum, at a position thereon determined by the location of the marker pulse. Subsequent to the recording of the first word of data upon the drum, a pair of marker pulses are recorded on the drum by a pair of magnetic heads located at opposite sides of the drum. The first marker pulse and one pulse of the latter pair of pulses are erased by one of the magnetic heads, and the remaining marker pulse is read by the other head. The reading of the remaining marker pulse (which is precessed from the originally recorded marker pulse) permits a word of data to be recorded on the drum at a location determined by that marker pulse, and by the head performing the reading operation.

New marker pulses are, therefore, recorded and erased iteratively so that a marker pulse, in effect, is precessed about the periphery of the drum.

The novel features of this invention and other objects and advantages thereof, together with its organization and method of operation, will become more apparent when read in connection with accompanying drawings, in which.

Figure 3A:
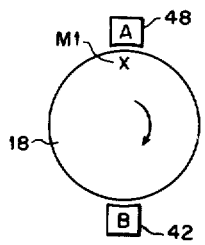
Figure 3B:
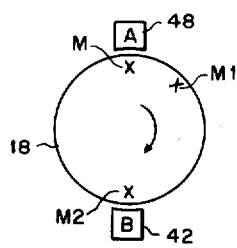
Figure 3C:
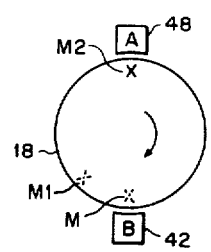

FIGS. 3A, 3B, and 3C are timed diagrams of the marker track of a magnetic drum at various intervals of time; and FIGS. 4A through 4H are diagrams, illustrating in chronological fashion, the marker and data recordings on the magnetic drum.

Figure 1:
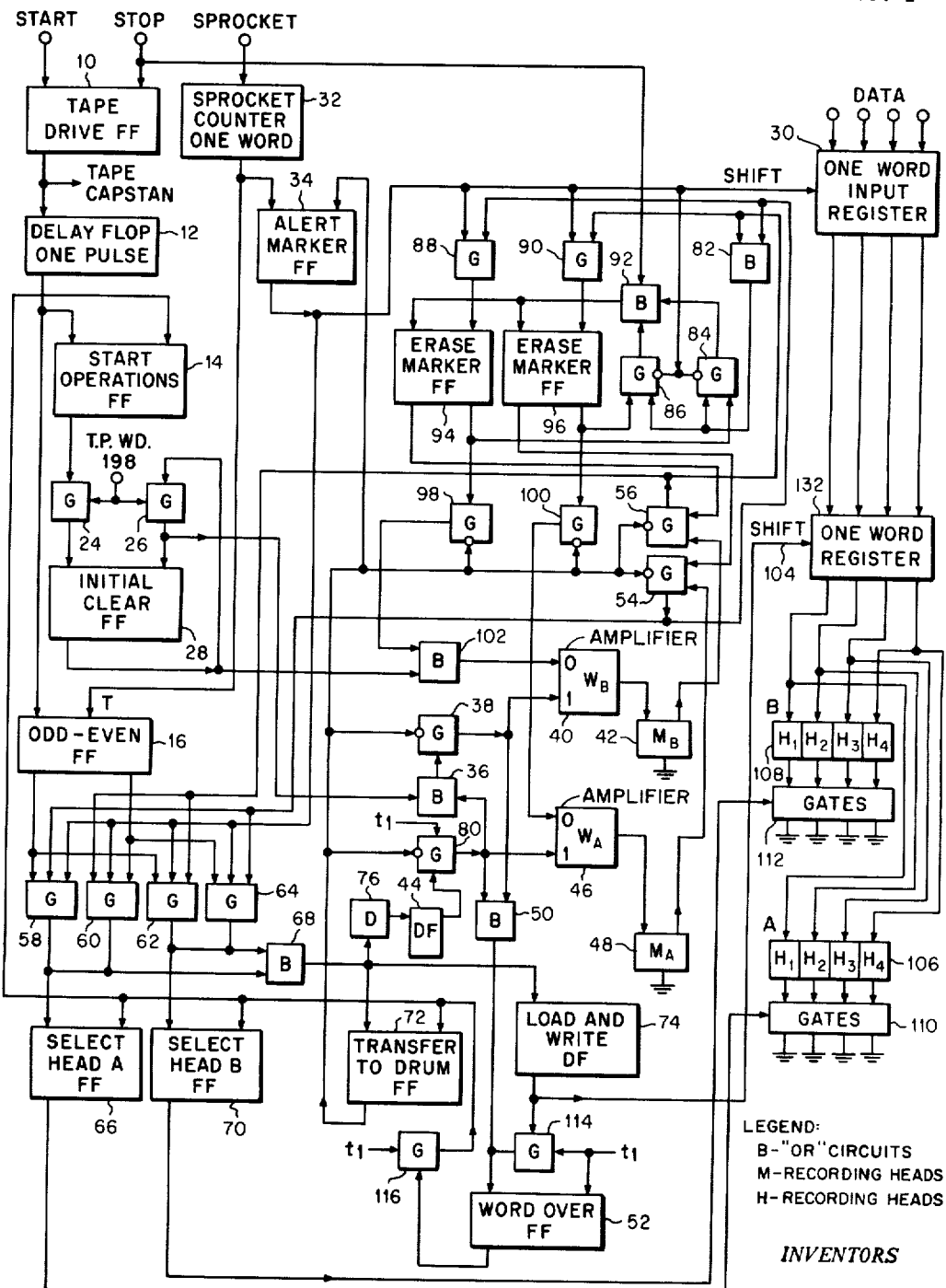
FIG. 1 is a block diagram of a preferred embodiment of this invention.

Referring to FIG. 1, there is shown a Tape Drive Flip Flop 10, which is set by a "start" signal applied at the set input terminal thereof and which is reset by a "stop" signal applied at its reset input terminal.

A flip flop circuit is a bistable device which can be placed in one of two stable conditions by the application of an appropriate signal applied to its "set" input terminal, and is placed in the other stable condition by an appropriate signal applied to its "reset" input terminal. A flip flop, according to the convention used herein, is set or reset, respectively, by an enabling signal applied to the upper left or upper right terminals. The flip flop, when set, provides an enabling signal at its lower left hand terminal; when reset, the flip flop provides an enabling signal at its lower right terminal. Flip flops can have their states switched from one condition to the other (i.e. triggering) by the application of an appropriate pulse to a "trigger" input terminal T of the flip flop.

The set output terminal of the Tape Drive Flip Flop 10 is coupled to drive a tape handling system by driving both a tape capstan and a take-up tape reel. The tape system is not shown for simplicity of description.

The set output of the Tape Drive Flip Flop 10 is coupled to set a delay flop 12 for one pulse period. The set output terminal of the delay flop 12 is coupled to set a Start Operations Flip Flop 14 and to set an Odd-Even Flip Flop 16.

A delay flop, also termed a "one-shot" multivibrator or monostable multivibrator, is a device, well known to the art, which provides an output therefrom for a fixed period of time upon the application of an input signal thereto.

Figure 2:
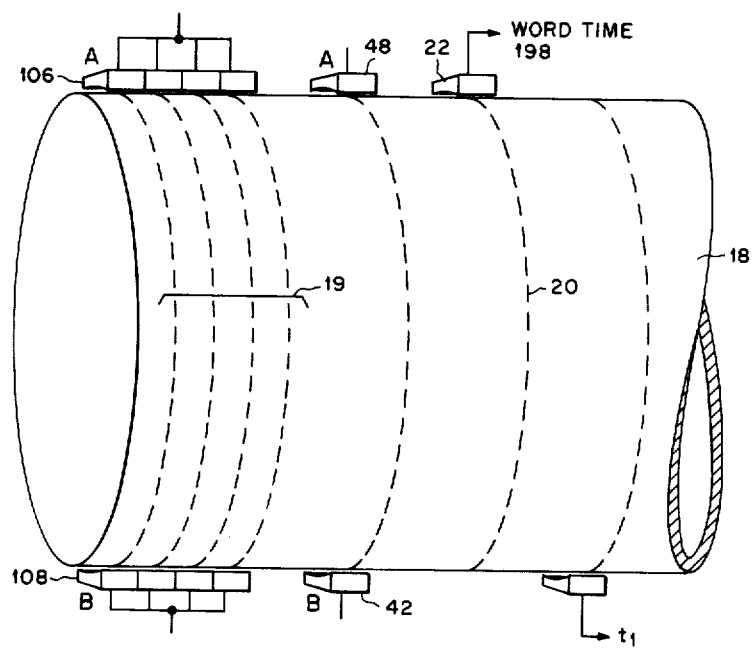
FIG. 2 is a diagram of a magnetic drum, illustrating various timing tracks thereon.

A magnetic drum 18, as shown in FIG. 2, is capable of having recorded thereon a plurality of binary digits of information. In one embodiment, for example, without intending to limit this invention, 2400 digits of data can be recorded about the circumference of the drum 18. A plurality of circumferential tracks 19, for example, four, can be used as a "band" of storage, so that, for example, a character of information such as the number eight, can have pulses 1011 recorded, respectively, on the four tracks at the same timed (axial) position of the drum.

A "1" is a magnetic pulse recorded in a first direction upon a magnetic drum. A "0" is a magnetic pulse recorded in the opposite direction upon the drum. In other words, there are two directions of magnetizations, a "1," and a "0," respectively.

Each sequence of twelve characters is termed a word. In the embodiment described herein, the drum is capable of recording thereon 200 words (i.e., 2400 digits).

A timing pulse which is generated during the word time 198 (which can be produced for example, from a separate timing track 20 on the magnetic drum 18 and read by a head 22) is applied to a pair of two-input "and" gates 24, 26, respectively. The set output of the Start Operations Flip Flop 14 is applied to the other input terminal of the "and" gate 24. The output of the "and" gate 24 is coupled to set an Initial Clear Flip Flop 28, which set output is coupled to the other input terminal of the "and" gate 26, the output of the "and" gate 26 being coupled to reset the Initial Clear Flip Flop 28.

The four tracks of data on the input tape are applied to a one word input register 30. Sprocket pulses from the input tape are applied to a sprocket counter 32 which provides an output therefrom whenever one word (for example, 12 digits) is counted. The output from the sprocket counter 32 is coupled to the trigger terminal of the Odd Even Flip Flop 16 and is also coupled to set a Marker Alert Flip Flop 34. The Marker Alert Flip Flop 34, when set, applies a shift signal to the one word input register 30 to shift the word stored therein to another one word register 132.

The output of the "and" gate 26 is coupled to one input of an "or" circuit or buffer 36. The output of the buffer 36 is coupled through a gate 38 to a "one" terminal of a write amplifier 40 which drives a marker magnetic head 42. The magnetic head 42 writes a "1" on the magnetic drum 18 when a signal is applied to the 1 input of the write amplifier 40. A "0" is recorded by the marker magnetic head 42 whenever a signal is applied to the zero input of the write amplifier 40. When simultaneous inputs are applied to both the "0" and "1" terminals of the write amplifier 40, the marker head 42 records a 1. The output of an inhibit gate 80 is applied to the other input terminal of the buffer 36, and is also applied to a "one" input terminal of a write amplifier 46 which is coupled to a marker magnetic head 48. The marker amplifier 46 operates in a manner similar to that of the marker amplifier 40. The output of the inhibit gate 80 and the output of the gate 38 are coupled to a pair of inputs of an "or" circuit 50 which output is coupled to set a Word Over Flip Flop 52.

A marker magnetic head 42 or 48 is so constructed, in accordance with techniques well known in the art, so that when it is not recording (writing) data onto the drum 18, it is adapted to read (play-back) data from the drum.

The marker recording head 48, when in its reading mode of operation, is coupled to a gate 54. The output of the marker head 42, when in its reading mode of operation, is coupled to a gate 56. The set output of the Odd-Even Flip Flop 16 is coupled to one input of a pair of three-input "and" gates 58, 62. The reset output of the Odd-Even Flip Flop 16 is coupled to one input of a pair of three-input "and" gates 60, 64. The output of the gate 54 is coupled to the second input terminals of the gates 58, 64. The output of the gate 56 is coupled to the second input terminals of the gates 60, 62. The output of the Marker Alert Flip Flop 34 is coupled to the third input terminals of the gates 58, 60, 62, and 64.

The outputs of the gates 58 and 60 are coupled to set a Select Head (A) Flip Flop 66 and is also coupled to a buffer 68. The outputs of the gates 62 and 64 are coupled to the set input of a Select Head (B) Flip Flop 70 and also to another input of the buffer 68. The output of the buffer 68 is coupled to set a Transfer to Drum Flip Flop 72 and to the set input of a Load and Write Delay Flop 74. The output of the buffer 68 is delayed by a delay means 76 and is applied to set a Write Marker Delay Flop 44 which provides an output pulse therefrom having a duration exceeding one digit time, but not exceeding one word time, preferably, but not limited thereto, one-half word time. The output of the delay flop 44 is coupled to the inhibit gate 80, together with a $t_1$ timing pulse which is obtained from the drum 18 (FIG. 2).

The output of the marker gate 54 is coupled to a buffer 82 which output is coupled to a pair of gates 84 and 86. The output of the marker gate 54 is also coupled to one input of an "and" gate 88. The output of the marker gate 56 is coupled to another input of the buffer 82, and, also, to one input of a two-input "and" gate 90. The set output of the Marker Alert Flip Flop 34 is coupled to the second inputs of the gate 88, 90, and, in addition, the Marker Alert Flip Flop 34 is coupled to inhibit the gates 84, 86. The outputs of the gates 84, 86 and the "stop" signal are coupled through a buffer 92 to the set inputs of a pair of Erase Marker Flip Flops 94, 96. The output of the gate 88 is coupled to reset the Erase Marker Flip Flop 94; the output of the gate 90 being coupled to reset the Erase Marker Flip Flop 96. The reset output of the Erase Marker Flip Flop 94 is coupled to another input of the gate 84 and to an input of a gate 98. The reset output of the Erase Marker Flip Flop 96 is coupled to another input of the gate 86 and also to an input of a gate 100. The set output of the Erase Marker Flip Flop 94 is coupled to one terminal of the gate 56. The set output of the Erase Marker Flip Flop 96 is coupled to a second input of the gate 54. The output of the Initial Clear Flip Flop 28 and the output of the gate 98 are coupled through a buffer 102 to the zero input of the write amplifier 40. The output of the gate 100 is coupled to the zero input of the write amplifier 46. The output of the Transfer to Drum Flip Flop 72 is coupled to inhibit the gates 38, 54, 56, 80, 98 and 100 and is also coupled to reset the Marker Alert Flip Flop 34.

The output of the Load and Write Delay Flop 74 is coupled to read out data from the one word register 132, which in effect, logically opens a set of gates to permit data to be transferred from the one word register 132 to either the set of A recording heads 106 or the set of B recording heads 108. A signal on the shift line 104, in effect, shifts the one word stored in the register 132 to the recording heads. The A recording heads 106 are adapted to be energized when the gates 110 are opened, the B recording heads 108 being adapted to be energized when the gates 112 are opened. The gates 110, 112, are, in effect, switches, and may be, for example, separate enabling windings on the various associated magnetic heads. The output of the Load and Write Delay Flop 74 is also coupled to a one input terminal of a two-input "and" gate 114, the other input terminal being adapted to receive a timing pulse $t_1$ which occurs once at every word time. The timing pulse $t_1$ is also coupled to reset the Word Over Flip Flop 52, and to open an "and" gate 116. The output of the gate 114 is coupled to set the Word Over Flip Flop 52.

The output of the Word Over Flip Flop 52 is coupled through the gate 116, which is open at the time $t_1$, to reset the Transfer to Drum Flip Flop 72, the Select Head A Flip Flop 66, the Select Head B Flip Flop 70, and the Start Operations Flip Flop 14.

Teh output of the Select Head A Flip Flop 66 is coupled to open the gates 110 to permit writing by the A heads 106 upon the magnetic drum 18. The Select Head B Flip Flop 70 is coupled to open the gates 112 to permit writing by the B recording heads 108 upon magnetic drum 18.

hTe teachings of this invention become more apparent from the following description of the operation of an embodiment of this invention.

In a typical tape-to-drum transfer, the speed of the drum is inherently faster than the speed of the tape. In one embodiment, the tape medium operates at a 2 kc. character rate; the drum operates at a 700 kc. character rate.

CLEARING THE MARKER TRACK

At the end of a previous operation, the "stop" signal, being applied through the buffer 92, sets the Erase Marker Flip Flops 96 and 94, thereby placing an enabling signal on the gates 54 and 56.

An application of a start signal to the Tape Drive Flip Flop 10 causes the tape to move at a constant speed. The output of the Tape Drive Flip Flop 10 actuates the delay flop 12 which produces a pulse to set the Start Operations Flip Flop 14 and to set the Odd-Even Flip Flop 16. The Odd-Even Flip Flop 16 provides an enabling signal to one input of two gates 58, 62. The output of the Start Operations Flip Flop 14 is applied to the gate 24 so that, upon the occurrence of a timing pulse at the word time 198, the Initial Clear Flip Flop 28 is set providing a set output to be applied through the buffer 102 to the zero input of the write amplifier 40 to cause zeros to be written by the B marker head 42 upon the drum 18. At the following word time 198, the gate 26 opens, causing the Initial Clear Flip Flop 28 to reset.

Thus, the entire marker track has zeros written thereon by the B marker head 42.

RECORDING FIRST MARKER

The gate 26, when opened, in addition to resetting the Initial Clear Flip Flop 28, sends a pulse through the buffer 36 and the gate 38 to the one terminal of the write amplifier 40 to cause a one to be written by the B marker head 42.

SHIFTING OF DATA AND ALERTING THE MARKER

When a word of data is read into the one word input register 30, one character at a time, from the tape by appropriate reading means (not shown), the sprocket counter 32 provides an output pulse which sets the Marker Alert Flip Flop 34. The sprocket counter output pulse triggers the Odd-Even Flip Flop 16 so that its reset output terminal provides enabling signals to one terminal of the gates 60 and 64. The output of the Marker Alert Flip Flop 34 applies enabling signals to the gates 58, 60, 62 and 64, and, also, shifts the data from the register 30 into the register 132 in anticipation of the marker pulse. The shifting of data from the input register 30 into the register 132 can be performed serially character by character, or in parallel, the entire word at a time, as desired. The marker pulse is read by either the marker head 42 or 48 depending upon where the marker is located with relation to the two heads.

READING OF MARKER

Assuming that the marker pulse is read by the A marker head 48, a pulse is generated through the gate 54 which applies an enabling signal to the gates 58 and 64 and is also applied to the buffer 82 and to the gate 88. The signal of the buffer 82 at this time, does not pass through either of the gates 84, 86 due to the inhibition signal present from the Marker Alert Flip Flop 34. The output of the gate 88 is coupled to the reset terminal of the Erase Marker Flip Flop 94 which removes the energizing signal from the gate 56 and applies a signal to the gate 98.

The gate 64 has three enabling signals applied thereto, namely, the set output from the Marker Alert Flip Flop 34, the marker output from the gate 54, and the reset output from the Odd-Even Flip Flop 16. The output of the gate 64 sets the Select Head B Flip Flop 70 which provides an output signal to open the gates 112. The output from the gate 64 further passes through the buffer 68 to set the Load and Write Delay Flop 74 which output provides a signal on the shift line 104 to permit transfer of data from the one word register 137 to the B heads 108 and the gates 112 thereby permitting the recording of the one word of data onto the drum 18. The shifting of data from the register 132 causes a serial readout of characters to be recorded onto the drum 18. This serial readout occurs at a synchronized rate with respect to the drum 18 by appropriate means, not shown for conciseness and clarity of description.

During the period when one word is being written upon the drum 18, the output of the buffer 68 sets the Transfer to Drum Flip Flop 72 which applies inhibiting signals to the gates 38, 54, 56, 80, 98, 100 and resets the Marker Alert Flip Flop 34. At time $t_1$, the gate 114 opens, setting the Word Over Flip Flop 52, so that, at the following word time, the output of the gate 116 opens to apply a pulse to reset the Transfer to Drum Flip Flop 72, the Select Head A Flip Flop 66, the Select Head B Flip Flop 70, and the Start Operations Flip Flop 14.

INSERTION OF NEW MARKERS

The output of the buffer 68 is coupled to the delay means 76. The delay means 76 can be fixed or varied at desired delay times to permit recording upon the drum either in a sequential fashion or in an interlaced manner. Such an interlaced recording, for example, may occur on a 200 word drum by recording a word at a time at every third word position, such as word addresses: 1, 4, 7, 10, ... 196, 199, 2, 5, 8, ... 197, 200, 3, 6, 9, ... 195, 198. The delay means 76 can be any appropriate means for delaying a pulse, which may be, for example (but not limited thereto); a delay line, an L-C circuit, or by the recording and reading of pulses upon a special track on a magnetic drum.

Subsequent to the first word being written on the drum 18, the delay means 76 provides a pulse therefrom through the delay flop 44 to the gate 80. The gate 80 is free to pass the pulse at time $t_1$ because the gate lacks an inhibition signal from the Transfer to Drum Flip Flop 72. The input to the gate 80 from the delay flop 44 is a pulse approximately one-half word time in length to insure that the output from the gate 80 occurs at the time $t_1$, in synchronism with the drum 18. The output from the gate 80 is passed through the buffer 36 and the gate 38 to the "one" terminal of the write amplifier 40. The output of the gate 80 is also coupled to the "one" terminal of the write amplifier 46. The output of the write amplifier amplifier 40 writes a "one" onto the drum 18 by the B marker head 42. The output of the write amplifier 46 writes a "one" onto the drum 18 by the A marker head 48. The marker heads 42, 48, therefore, record a pair of oppositely disposed marker pulses on the magnetic drum 18.

Referring to FIG. 3A, the first marker pulse M1 (recorded by the B head 42) is detected by either the head 42 or 48 (in the example described above, the head 48). The transfer of information from the input register to the drum then can start if the input register is filled.

Later, as shown by FIG. 3B, the markers M and M2 are recorded onto the drum by the heads 48, 42, respectively, in response to the signal generated by the delay means 76.

ERASURE OF MARKERS WITH ONE HEAD AND READING OF MARKER WITH OTHER HEAD

The data translator is now prepared to erase the first marker M1 and the superfluous marker M from the drum.

It is recalled that the Erase Marker Flip Flop 96 is in its set condition, thereby applying an enabling signal to the gate 54. The Erase Marker Flip Flop 94 is reset and is applying an enabling signal to the gate 98.

The gate 98, upon the removal of the set output from the Transfer to Drum Flip Flop 72, passes an enabling signal through the buffer 102 to the "zero" terminal of the write amplifier 40, causing zeros to be written by the B marker head 42 onto the drum 18. It is evident that the writing of "zeros" upon the drum is synonymous with the erasure of "ones."

The writing of zeros by the B marker head 42 continues until a pulse is read by the A marker head 48 which passes through the gate 54, the buffer 82, the gate 84, and the buffer 92 to thereby set the Erase Marker Flip Flop 94, removing the enabling level to the gate 98, thereby causing the B marker head 42 to stop erasing.

Referring to FIG. 3C, it is noted that at this particular interval of time, the marker pulses M1 and M have been erased. The only marker pulse currently remaining on the drum 18 is the marker pulse M2.

RECORDING OF SUBSEQUENT WORDS

The above-described operation is continually repeated: The input register 30 is filled; a marker pulse is read; one word of data is recorded on the drum; a pair of new marker pulses are written on the drum; and the old and one of the new marker pulses are erased.

SELECTION OF HEADS FOR RECORDING OF DATA

Referring to FIG. 1, the A heads 106 are selected for recording when either the gates 58 or 60 are open; the B heads 108 are selected for recording when either the gates 62 or 64 are open. Table 1, shown below, illustrates the conditions when the respective heads are free to record.

Table 1

| | | |
|---|---|---|
| A<br>Heads 106 Permitted to Record. | Gate 58 Open. | Odd-Even Flip Flop 16 is Set.<br>Marker Pulse from A marker head 48.<br>Marker Alert Flip Flop 34 is set. |
| | Gate 60 Open. | Odd-Even Flip Flop 16 is Reset.<br>Marker pulse from B Marker head 42.<br>Marker Alert Flip Flop 34 is Set. |
| B<br>Heads 10 Permitted to Record. | Gate 62 Open. | Odd-Even Flip Flop 16 is set.<br>Marker pulse from B marker head 42.<br>Marker Alert Flip Flop 34 is Set. |
| | Gate 64 Open. | Odd-Even Flip Flop 16 is Reset.<br>Marker Pulse from A marker head 48.<br>Marker Alert Flip Flop 34 is Set. |

The A heads 106 or the B heads 108 are permitted to record upon the magnetic drum 18 when a marker pulse is received from its corresponding A marker head 48 or B marker head 42, respectively, for alternate (e.g. even) words. At other word times (e.g. odd) the A or B heads 106, 108 are permitted to record when a marker pulse is received from the opposite related marker head B or A, respectively.

To clarify the above, reference is made to FIGS. 4A through 4H, which illustrate, diagramatically, the recording of words by the various heads in relation to a timing pulse. FIG. 4A shows a timing pulse M1 which is read by the A marker head. As the drum rotates (clockwise, as shown), the reading of the marker pulse M1 causes the B heads to record the first word on the drum as shown in FIG. 4B. Thereafter, as shown in FIG. 4C, the marker pulse M2 is recorded upon the drum.

The marker pulse M1 is subsequently erased, and, as shown by FIG. 4D, the marker pulse M2 is subsequently read. When the marker pulse M2 is read by the A marker head, as shown in the upper half of FIG. 4D, the second word is recorded upon the drum as the drum rotates, by the A heads, as shown by the upper half of FIG. 4E. When the marker pulse M2 is read by the B marker head, as shown by the lower half of FIG. 4D, the second word is recorded by the B heads, as shown by the lower half of FIG. 4E.

Subsequently, as shown in FIG. 4F, the marker pulse M3 is written upon the drum, the pulse M2 being erased from the drum.

As shown in the upper half of FIG. 4G, when the marker pulse M3 is read by the A marker head, the third word is recorded by the B recording heads, as shown in the upper half of FIG. 4H. However, when the marker pulse is read by the B marker head, as shown in the lower half of FIG. 4G, the third word is recorded by the A recording heads, as shown in the lower half of FIG. 4H.

The "stop" signal, which is applied to the reset input of the Tape Drive Flip Flop 10 and to the buffer 92 for setting the Erase Marker Flip Flops 94 and 96, can be generated by various means. The stop signal can be a manually operated signal; it can come from an exterior control, such as a computer. It also can be derived from a signal specially encoded at the end of a reel of tape, or at the end of a set of data upon the tape, the specially encoded signal being decoded by suitable means for generating a stop signal. The stop signal can be generated by a control from the drum, indicating that the drum storage is filled to capacity. Further, a stop signal can be generated by suitable means (not shown) whenever an error is detected.

The above description relates to means, inter alia, for recording data upon a magnetic drum. Suitable means, not shown, can be devised by those skilled in the art for reading such data from the drum.

The specific embodiment, shown and described herein, details how the first, third, and fifth (odd) words are recorded by a set of heads opposite to the head that read the marker pulse, while the second, fourth, and sixth (even) words are recorded by a set of heads adjacent to the head which read the marker pulse. Minor modifications can be made for reversing this operation so that the first (odd) word is recorded by the set of heads adjacent to the marker head which read the marker pulse, and the second (even) word being recorded by the set of heads opposite to the marker head which read the marker pulse. Such a modification, among others, can be, for example, the reversal of the output leads of the Odd-Even Flip Flop 16.

Specific timing considerations have been de-emphasized so that the description of an embodiment of this invention and its operation is clear and concise, in addition to being sufficient, full, and exact, as to enable one skilled in the field to practice the invention. The timing pulse at the word time 198 had been chosen to be applied to the gates 24 and 26, so that, assuming a three word time delay, data is recorded at word time one (the drum having 200 word times per revolution). Electronic systems require a routine consideration of timing problems for purposes of design, due to various delays that can occur with amplifiers, other electrical circuits and in wires, per se. Therefore, it is deemed unessential to burden the description of the inventive concept of this invention with extraneous and burdensome detail.

A "word," such as described above, can comprise 12 characters of four bits each. It should be understood, however, that a "word" can have greater or less than 12 characters and/or greater or less than four bits. Generally, a "word" is defined as an ordered set of characters that is treated, stored, and transported by computer circuits as a unit. The embodiment described herein can accept data and manipulate data as half-words (or other fractional or multiple number), by merely adapting the registers to accommodate such quantities. Such modification is within the skill of the art.

Various embodiments and other modifications will be suggested to those skilled in the art from a teaching of applicants' invention. It is desired that this invention be limited solely by the terminology of the claims.

What is claimed is:

1. In combination, a magnetic drum having a timing track with one timing pulse normally recorded thereon; means for providing electronic signals indicative of data to be recorded from an input source; separate storage means coupled to said providing means for storing one word of data; means for detecting when one word of data has been stored in said storage means; means cooperatively coupled with said timing track for reading and recording from and upon said timing track; data recording means for recording data upon said drum; gating means operable upon the coincidence of a word of data stored in said storage means and a timing pulse read by said cooperatively coupled means, said gating means, when operable, being adapted to transfer the word of data stored in said storage means through said data recording means onto said drum; and means for recording a second timing pulse upon said drum and for erasing said one timing pulse from said drum; whereby a plurality of words of data can be recorded about the circumference of said drum.

2. A magnetic drum having data tracks thereon and a separate timing track thereon having one pulse recorded thereon, said tracks being positioned circumferentially about the drum; a first set of magnetic data heads for recording data upon said data tracks; a first marker magnetic head for recording, reading, and erasing marker pulses onto and from said timing track; a second set of magnetic data heads for recording data upon said data tracks, said second set being displaced circumferentially opposite to said first set of magnetic data heads; a second marker magnetic head for recording, reading, and erasing marker pulses onto and from said timing track, said second marker magnetic head being displaced circumferentially opposite to said first marker magnetic head; means for storing a word of data from an input source; and selection means for transferring a first set of alternate words stored in said storage means onto said drum via said first set of data heads when said first marker head reads a recorded pulse and via said second set of data heads when said second marker head reads a recorded pulse, and for transferring a second set of alternate words stored in said storage means onto said drum via said first set of data heads when said second marker head reads a recorded pulse and via said second set of marker heads when said first marker head reads a recorded pulse.

3. The combination as claimed in claim 2 wherein one set of alternate words are "odd" words, and the other set of alternate words are "even" words.

4. The combination as claimed in claim 2 including means for iteratively recording an additional pulse on said timing track and for erasing said one pulse from said timing track.

5. The combination as claimed in claim 2 including first means responsive to the initiation of the recording of a word of data upon said drum, second means responsive to said first means for providing a signal at a predetermined time interval after the initiation of said recording of a word of data; third means coupling said second means to said first marker head and to said second marker head for recording a pair of oppositely disposed pulses on said timing track; and fourth means for erasing said one pulse recorded on said drum and for erasing one pulse of said pair of pulses.

6. In combination, a magnetic drum adapted to be rotated about its axis, said drum having a timing track about its circumference and having a first timing pulse recorded thereon, a first magnetic transducer coupled to said timing track, a second magnetic transducer coupled to said timing track at a position opposite to said first transducer, data transfer means adapted to transfer data upon the coincidence of a data ready signal and a reading of a first timing pulse from said magnetic drum, said reading of said timing pulse occurring by means of one of said first and second transducers, means coupled to said first and second transducers for recording second and third timing pulses on said drum simultaneously, and means coupled to the other of said first and second transducers for erasing said first timing pulse and the next one timing pulse occurring after said first timing pulse.

7. In combination, a magnetic drum having a timing track and having data tracks about its circumference, a tape-drive bistable circuit adapted to be set by a start signal and adapted to be reset by a stop signal, a first pulse producing means adapted to produce a pulse when said circuit is set, a start-operations bistable circuit adapted to be set by said pulse producing means, a first coincidence gate adapted to provide an output therefrom upon the coincidence of a word reference pulse and the set condition of said start-operations bistable circuit, an initial-clear bistable circuit adapted to be set by the output of said coincidence gate, a second coincidence gate adapted to provide an output therefrom upon the coincidence of said word reference pulse and the set condition of said initial-clear bistable circuit, means coupling the output of said second coincidence gate to reset said initial-clear bistable circuit, an odd-even bistable circuit adapted to be set by said first pulse producing means, a first input register for storing one word of input data from an input source, sprocket means for detecting when one word of data is read into said register, means coupling said sprocket means to trigger said odd-even bistable circuit, a marker-alert bistable circuit adapted to be set by said sprocket means, a second one word register coupled to said first one word register, said marker-alert bistable circuit when set causing the data stored in said first register to be shifted into said second register, a first set of data recording heads, a second set of data recording heads, said first and second sets of heads being oppositely disposed about said drum in engagement with said data tracks, means for transferring the data stored in said second register to said sets of data recording heads, a first marker transducer in engagement with said timing track, a second marker transducer in engagement with said timing track oppositely located about said drum, a first marker head gate coupled to said first marker transducer for passing a marker pulse therethrough, a second marker head gate coupled to said second marker transducer for passing marker pulse therethrough, a first three-input select-head gate, a second three-input select-head gate, a third three-input select-head gate, a fourth three-input select-head gate, the set output of said marker-alert bistable circuit being coupled to one input of each of said first, second, third and fourth select-head gates, means coupling the set output of said odd-even bistable circuit to the second inputs of said first and third select-head gates, means coupling the reset output of said odd-even bistable circuit to the second inputs of said second and fourth select-head gates, means coupling the output of said first marker head gate to the third inputs of said first and fourth select-head gates, means coupling the output of said second marker head gate to the third inputs of said second and third select-head gates, a first select-head bistable circuit adapted to be set by the output of said first and second select-head gates, a second select-head bistable circuit adapted to be set by the output of said third and fourth select-head gates, means coupling the set output of said first select-head bistable circuit to energize said first set of data recording heads, means coupling the set output of said second select-head bistable circuit to energize said second set of data recording heads, means coupling the outputs of said first, second, third, and fourth select-head gates to provide a common "select" signal, means responsive to said "select" signal for actuating said transferring means for a fixed interval of time to permit said second register to transfer data to said data heads, a transfer-to-drum bistable circuit adapted to be set by said "select" signal, a word-over delay signal producing means responsive to said "select" signal actuating means, said word-over delay signal being coupled to reset said transfer-to-drum bistable circuit, said first and second select-head bistable circuits, and said start-operations bistable circuit, said transfer-to-drum bistable circuit when set being adapted to inhibit said first and second marker head gates, and to reset said marker-alert bistable circuit, a first two-input "and" gate adapted to be energized by the coincidence of an output from said first marker head gate and a set output from said marker-alert bistable circuit, a second two-input "and" gate adapted to be energized by the coincidence of an output from said second marker head gate and a set output from said marker-alert bistable circuit, a third two-input "and" gate adapted to be inhibited by the presence of the set output of said marker-alert bistable circuit, a fourth two-input "and" gate adapted to be inhibited by the presence of the set output of said marker-alert bistable circuit, a first erase-marker bistable circuit adapted when set to provide an enabling signal to said second marker head gate and when reset to provide an enabling signal to one input of said third "and" gate, a second erase-marker bistable circuit adapted when set to provide an enabling signal to said first marker head gate and when reset to provide an enabling signal to said fourth "and" gate, means coupling the outputs of said marker head gates to the other inputs of said third and fourth "and" gates, means coupling the outputs of said third and fourth "and" gates and said stop signal to set said first and second erase-marker bistable circiuts, means coupling the output of said first "and" gate to reset said first erase-marker bistable circuit, means coupling the output of said second "and" gate to reset said second erase-marker bistable circuit, a first inhibit gate adapted to be actuated by the reset output of said first erase-marker bistable circuit and adapted to be inhibited by the set output of said transfer-to-drum bistable circuit, a second inhibit gate adapted to be actuated by the reset output of said second erase-marker bistable circuit and adapted to be inhibited by the set output of said transfer to drum bistable circuit, means responsive to said first inhibit gate for writing zeroes on said magnetic drum by said second marker transducer, means responsive to said second inhibit gate for writing zeroes on said magnetic drum by said first marker transducer, a predetermined delay means responsive to said "select" signal, a third inhibit gate adapted to be actuated by said predetermined delay means and adapted to be inhibited by said set output of said transfer-to-drum bistable circuit, a fixed pulse producing means coupled to said third inhibit gate and adapted to provide signals to said first and second marker transducers for causing ones to be written on said drum, means coupling the output of said second coincidence gate to cause a one to be written by said second marker transducer onto said drum, and means coupling the set output of said initial-clear bistable circuit to said second marker transducer for causing zeroes to be written on said magnetic drum when said initial-clear bistable circuit is in its set state.

8. In combination, a magnetic drum having a plurality of data tracks about its circumference and having a marker track about its circumference, said marker track containing a marker pulse; first and second sets of data recording heads cooperating with said data tracks, said first set being oppositely disposed about said drum from said second set; a first and a second marker head cooperating with said marker track, said first marker head being oppositely disposed about said drum from said second marker head; means for receiving data signals; means selectively coupling said data signals receiving means to one only of said sets of data recording heads in accordance with the marker head reading said marker pulse; and means for transferring said pulse along said marker track.

References Cited by the Examiner

UNITED STATES PATENTS

| | | | |
|---|---|---|---|
| 2,540,654 | 2/51 | Cohen et al. | 340—172.5 |
| 2,801,407 | 7/57 | Lubkin | 340—174.1 |
| 2,904,776 | 9/59 | Neff | 340—174.1 |
| 2,907,005 | 9/59 | Chien et al. | 340—174.1 |

FOREIGN PATENTS 216,876   8/58   Australia.

MALCOLM A. MORRISON, *Primary Examiner.*

IRVING L. SRAGOW, *Examiner.*

UNITED STATES PATENT OFFICE
CERTIFICATE OF CORRECTION

Patent No. 3,199,084

August 3, 1965

Arthur J. Gehring, Jr., et al.

It is hereby certified that error appears in the above numbered patent requiring correction and that the said Letters Patent should read as corrected below.

Column 4, line 44, for "Teh" read -- The --; line 50, for "hTe" read -- The --; column 5, line 36, after "The" insert -- output --; line 53, for "13Z" read -- 132 --; column 7, Table 1, first column, line 6 thereof, for "10" read -- 108 --; column 10, line 10, after "passing" insert -- a --.

Signed and sealed this 15th day of March 1966.

(SEAL)
Attest:

ERNEST W. SWIDER
Attesting Officer

EDWARD J. BRENNER
Commissioner of Patents